United States Patent
Zegers et al.

(10) Patent No.: US 7,680,118 B2
(45) Date of Patent: Mar. 16, 2010

(54) METHOD AND APPARATUS FOR REORDERING FRAGMENTS WITHIN A MAC LAYER SERVICE DATA UNIT WITHIN A DOWNLINK FRAME

(75) Inventors: Leon J. Zegers, Amsterdam (NL); Marcel Korndewal, Amersfoort (NL); Wim Schaap, Kortenhoef (NL)

(73) Assignee: Motorola, Inc., Schaumburg, IL (US)

( * ) Notice: Subject to any disclaimer, the term of this patent is extended or adjusted under 35 U.S.C. 154(b) by 637 days.

(21) Appl. No.: 11/404,326

(22) Filed: Apr. 13, 2006

(65) Prior Publication Data
US 2007/0242686 A1 Oct. 18, 2007

(51) Int. Cl.
*H04L 12/28* (2006.01)
(52) U.S. Cl. .................. 370/394; 714/748; 714/776
(58) Field of Classification Search ......... 370/328, 370/395.6
See application file for complete search history.

(56) References Cited

U.S. PATENT DOCUMENTS

| | | | |
|---|---|---|---|
| 2003/0214928 A1* | 11/2003 | Chuah | 370/336 |
| 2004/0120292 A1 | 6/2004 | Trainin | |
| 2007/0121567 A1* | 5/2007 | Venkatachalam et al. | 370/343 |

OTHER PUBLICATIONS

Author: Subbu Ponnuswamy Title: ARQ Sequence Numbering for 802.16a Date: Jan. 5, 2002.*

* cited by examiner

*Primary Examiner*—Rafael Pérez-Gutiérrez
*Assistant Examiner*—Marcos Batista
(74) *Attorney, Agent, or Firm*—Ingrassia, Fisher & Lorenz, P.C.

(57) ABSTRACT

A method and apparatus for processes a downlink frame within a Medium Access Control (MAC) layer (348) where the downlink frame includes a plurality of fragments constituting one or more MAC Service Data Unit (MSDU)s. The MAC layer pre-processes the plurality of fragments of the downlink frame by reordering the fragments to reassemble one or more of the MSDUs (910) until an end-of-frame signal is detected (912). The end-of-frame signal indicates that all of the plurality of fragments for a downlink frame have been received. The MAC layer post-processes the plurality of fragments (916) in response to detecting the end-of-frame signal (912), then delivers the reassembled MSDUs to a next layer (918).

15 Claims, 7 Drawing Sheets

METHOD AND APPARATUS FOR REORDERING FRAGMENTS WITHIN A MAC LAYER SERVICE DATA UNIT WITHIN A DOWNLINK FRAME

FIELD OF THE INVENTION

The present invention generally relates to packet-based communication systems which pass the packets through a Media Access Control (MAC) layer before processing the information contained therein, and more particularly relates to a method and apparatus for reordering packet fragments within a MAC Service Data Unit (MSDU).

BACKGROUND OF THE INVENTION

The Open System Interconnection (OSI) model defines a networking framework for implementing protocols in seven hierarchy layers. Control is submitted from one layer and delivered to the next layer through Service Access Points (SAPs), starting at the Application layer in one station and proceeding to the bottom layer or Physical layer. The seven layers are: an Application layer, a Presentation layer, a Session layer, a Transport layer, a Network layer, a Data Link layer, and a Physical layer. A Media Access Control (MAC) layer is a sub-layer of the Data Link layer and provides information to and/or receives information from the Physical layer, such as demodulated and decoded packets from downlink receiver circuitry. For example, in burst-mode wireless communications, at the uplink side, MAC Service Data Units (MSDUs) are submitted to the MAC layer and the MAC layer creates MAC protocol data units (MPDUs) including one or more fragments of MSDUs. The MAC layer submits the MPDUs to the Physical layer and the Physical layer creates downlink bursts from the submitted MPDUs, the bursts being included in downlink frames. The downlink frames are encoded and modulated for transmission from a transmitter.

The IEEE 802.16 standard provides an Air Interface specification for fixed broadband wireless communication systems which passes packets through a MAC layer, each fragment within the packet being provided a fragmentation subheader for numbering thereof. At downlink reception, fragments are received within a PDU at a Physical layer and passed to the MAC layer as received. The MAC layer is constrained to pass the MSDU to the next layer as ordered fragments.

Packet-based wireless communication systems, however, may communicate packets in bursts and wireless communication systems such as orthogonal frequency division multiple access (OFDMA) systems are particularly susceptible to having packets within multiple downlink bursts possibly interleaved within each other. As MSDUs are being reassembled at the MAC layer, the MAC layer will verify that each fragment of the MSDU being received is received in order. When an out of order fragment is detected, the fragments of the MSDU being reassembled will be discarded. The discarded fragments will either be lost information, decreasing the reliability of communications, or will need to be retransmitted, thereby increasing the time necessary for receiving reliable communications.

Thus, what is needed is a method and apparatus for reordering fragments within a MSDU. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

FIG. 8, including

DETAILED DESCRIPTION OF THE INVENTION

A method for processing a downlink frame within a Medium Access Control (MAC) layer which includes a plurality of fragments constituting one or more MAC Service Data Unit (MSDU)s includes the steps of pre-processing the plurality of fragments of the downlink frame, detecting an end-of-frame signal indicating that all of the plurality of fragments for a downlink frame have been received, post-processing the plurality of fragments of the downlink frame in response to detecting the end-of-frame signal, and delivering one or more of the MSDUs to a next layer.

A communication device includes receiver circuitry receiving signals from a source external to the communication device, a physical layer processor and a Media Access Control (MAC) layer. The physical layer processor is coupled to the receiver and processes the signals in accordance with a predetermined physical layer coding scheme to recover a downlink frame. The physical layer also generates a plurality, of protocol data units (PDUs) comprising a plurality of fragments of the downlink frame and generates an end-of-frame signal. The MAC layer processor is coupled to the physical layer processor and receives the plurality of PDUs therefrom, including the plurality of fragments. The MAC layer processor pre-processes the plurality of fragments of the downlink frame to reassemble MAC service data units (MSDUs) therefrom and, in response to detecting the end-of-frame signal indicating that all of the plurality of fragments for a downlink frame have been received, post-processes the MSDUs of the downlink frame, the MAC layer processor delivering one or more of the MSDUs to a next layer.

The following detailed description of the invention is merely exemplary in nature and is not intended to limit the invention or the application and uses of the invention. Furthermore, there is no intention to be bound by any theory presented in the preceding background of the invention or the following detailed description of the invention. In the embodiment of the present invention described hereinbelow, a wireless communication system is described and downlink communications from a base station to a wireless communication device such as a subscriber or mobile station is described. The invention, however, is not limited to this one stream of communication. For example, the embodiment of the present invention described hereinbelow is equally applicable to communications from the subscriber station to the base station. Additionally, the embodiment of the present invention is applicable to communication systems other than wireless communication systems and to wireless communication systems other than orthogonal frequency domain multiple access (OFDMA) wireless communication systems.

Figure 1:
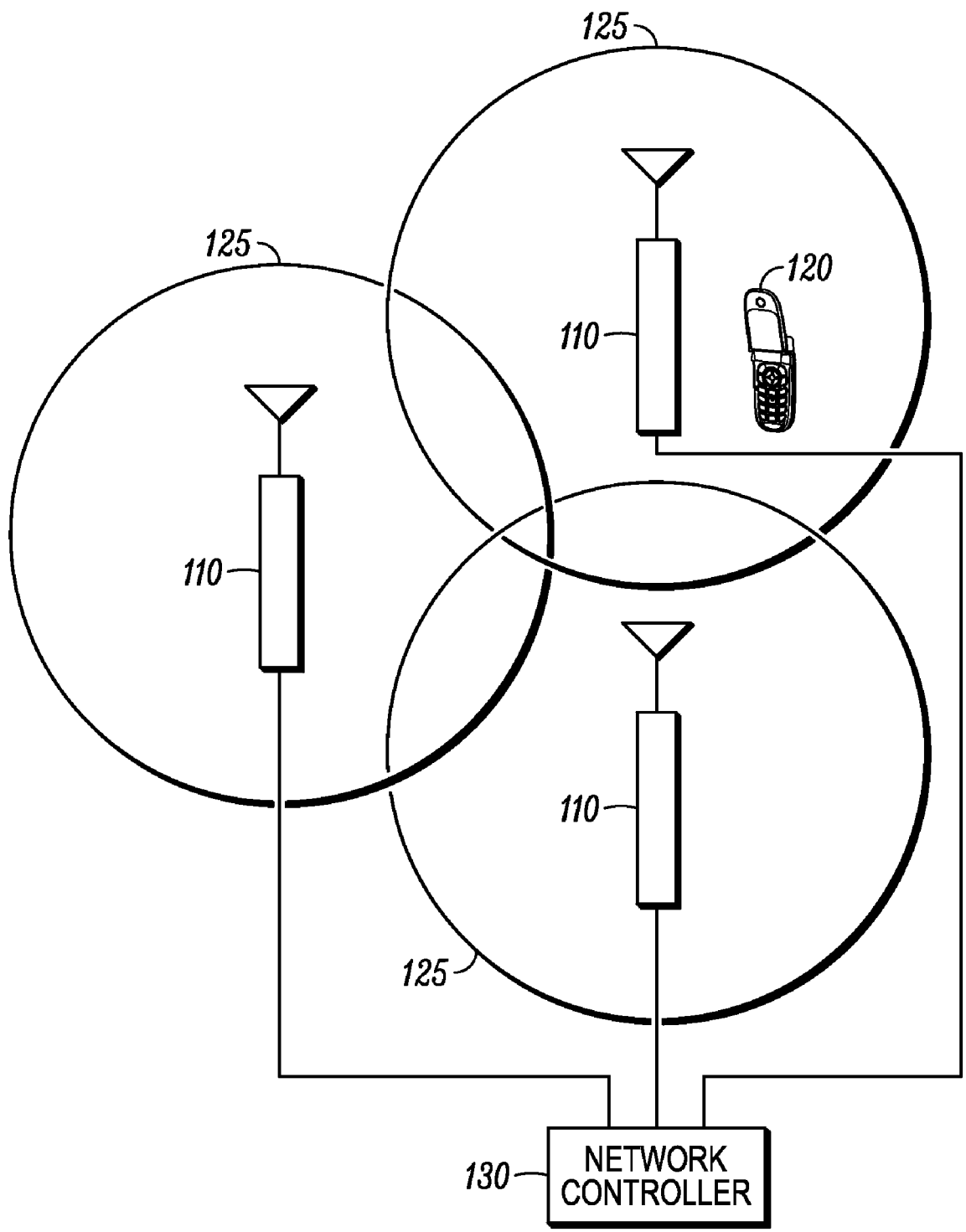
FIG. 1 is a diagram of a wireless communication system in accordance with an embodiment of the present invention.

Referring to FIG. 1, an orthogonal frequency division multiple access (OFDMA) wireless communication system 100 in accordance with an embodiment of the present invention includes a plurality of base stations 110 and a wireless communication device 120. The plurality of base stations 110 communicate with the wireless communication device 120 via OFDMA radio frequency (RF) signals on a plurality of subcarriers for wireless communications. Associated with each of the plurality of base stations 110 is a coverage area 125 wherein the wireless communication device 120 can receive OFDMA signals from and transmit signals to one or more of the plurality of base stations 110. The plurality of base stations 110 are coupled to a network system controller 130 for centralized control of the OFDMA wireless communication system.

An OFDMA wireless communication system is a multi-carrier modulation scheme which has been proposed as a next generation solution for present wide-area code division multiple access (WCDMA) wireless communication systems. OFDMA is a more general case of an orthogonal frequency domain multiplexing (OFDM) system wherein data for different users can be transmitted simultaneously on different subcarriers as packets of information typically transmitted in downlink bursts.

Figure 2:
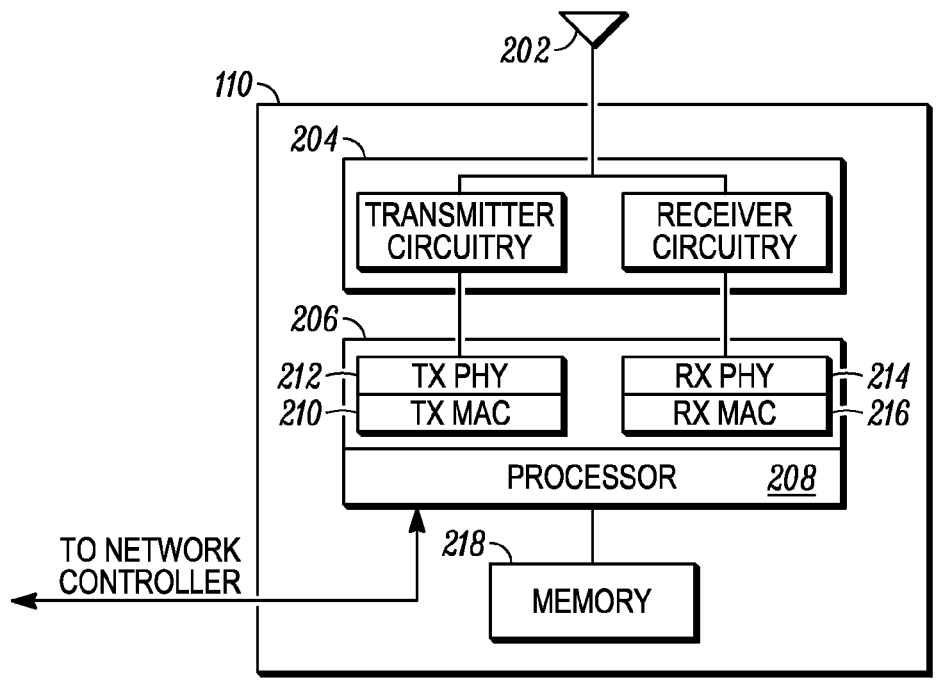
FIG. 2 is a block diagram of a base station of the wireless communication system of FIG. 1 in accordance with the embodiment of the present invention.

Referring to FIG. 2, a base station 110 in accordance with the embodiment of the present invention includes an antenna 202 coupled to transceiver circuitry 204 for transmitting RF signals comprising encoded and modulated data. The transceiver circuitry 204 is coupled to a controller 206. The controller 206 includes a processor 208 which submits information to a MAC layer encoder 210 coupled to a Physical layer encoder 212, the Physical layer encoder 212 providing signals to the antenna 202 for downlink transmission to the wireless communication device 120. For uplink communications, the antenna 202 is coupled to a Physical layer 214 coupled to a MAC layer 216 for deciphering the information provided thereto and submitting that information to the processor 208. A memory device 218 is also provided in a typical manner for storing code and data necessary for the operation of the base station 110.

Figure 3:
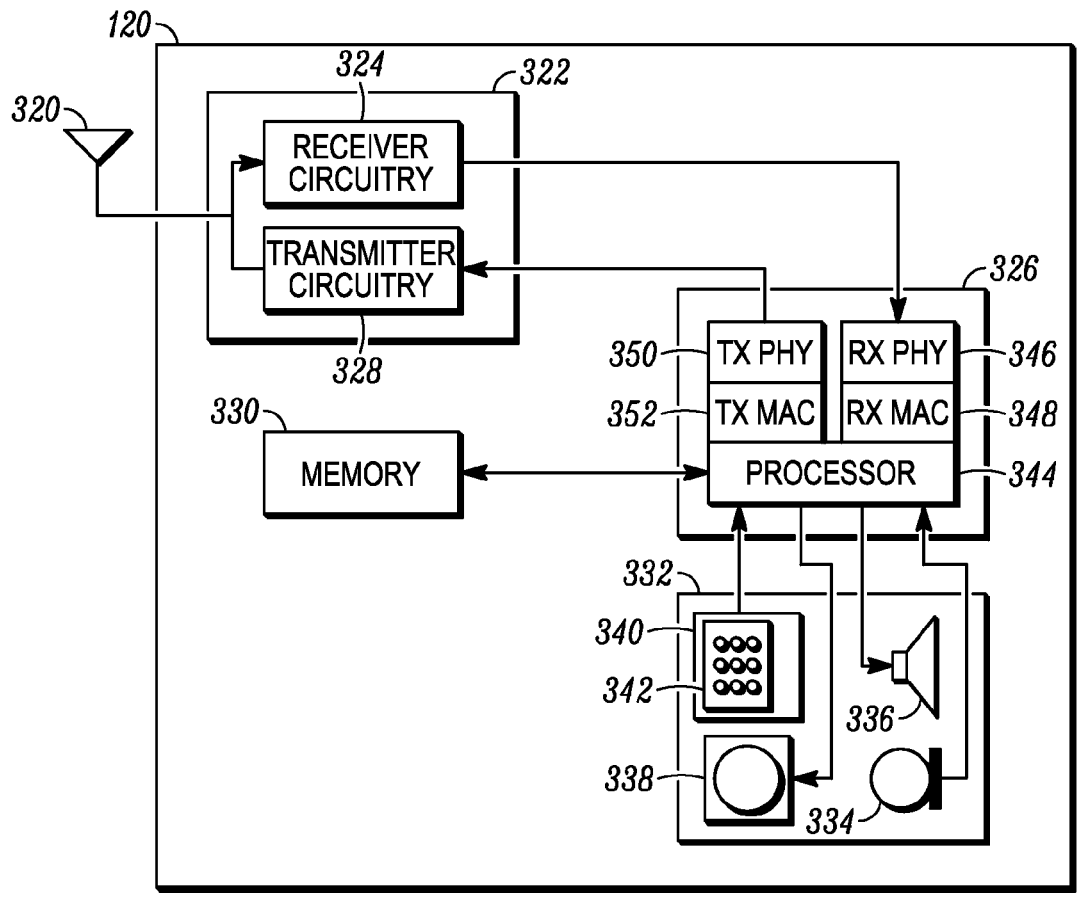
FIG. 3 is a block diagram of a wireless communication device of the wireless communication system of FIG. 1 in accordance with the embodiment of the present invention.

Referring to FIG. 3, the wireless communication device 120 includes an antenna 320 for receiving and transmitting radio frequency (RF) signals. Transceiver circuitry 322 includes receiver circuitry 324 which demodulates and decodes RF signals received from the base station 110 to derive information therefrom and is coupled to a controller 326 for providing the decoded information thereto for utilization thereby in accordance with the function(s) of the wireless communication device 120. The controller 326 also provides information to transmitter circuitry 328 of the transceiver circuitry 322 for encoding and modulating information into RF signals for transmission from the antenna 320.

As is well-known in the art, the controller 326 is typically coupled to a memory device 330 and a user interface 332 to perform the functions of the wireless communication device 120. The user interface 332 includes a microphone 334, a speaker 336 and a display 338 which may be designed to accept touch screen inputs. The user interface 332 also includes one or more key inputs 340, including a keypad 342. In accordance with the present invention, the controller 326 includes a processor 344, a downlink Physical layer processor (RX PHY) 346, a downlink MAC layer processor (RX MAC) 348, an uplink Physical layer processor (TX PHY) 350, and an uplink MAC layer processor (TX MAC) 352.

Figure 4:
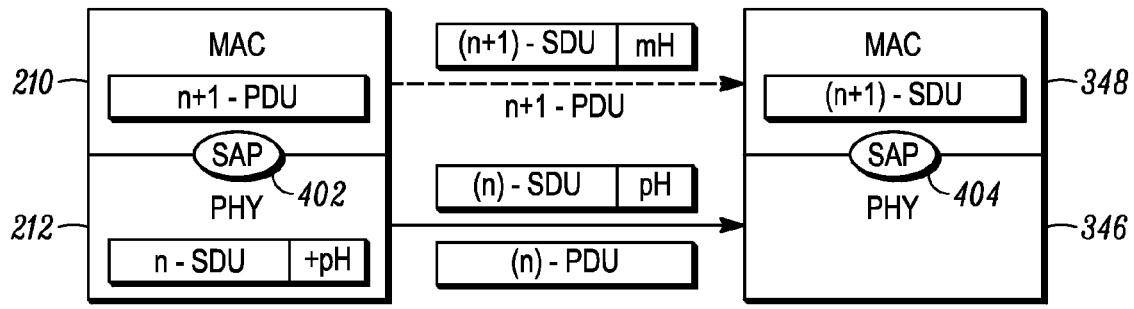
FIG. 4 is a diagram of communication across layers of an Open System Interconnection (OSI) network.

Referring next to FIG. 4, a diagram of communication across layers of an Open System Interconnection (OSI) network is shown. The OSI network is a framework for implementing protocols in seven hierarchy layers. Control is submitted from one layer and delivered to the next layer through Service Access Points (SAPs), starting at the Application layer in one station and proceeding to the bottom layer or Physical layer. The seven layers are: an Application layer, a Presentation layer, a Session layer, a Transport layer, a Network layer, a Data Link layer, and a Physical layer. A Media Access Control (MAC) layer is a sub-layer of the Data Link layer and provides information to and/or receives information from the Physical layer, such as demodulated and decoded packets from downlink receiver circuitry.

In OSI networks, layer n+1 entities make use of layer n services via a Service Access Point (SAP). FIG. 4 depicts downlink communication from a base station MAC layer (layer n+1) encoder 210 to a Physical layer (layer n) encoder 212 via a first SAP 402. As shown, (n+1) protocol data units (PDUs) are submitted by the MAC layer encoder 210 to the (n)SAP 402 and transitions to a n-service data unit (SDU) within the Physical layer encoder 212. PDUs are communicated between peer layers (e.g., between 'transmitter' MAC encoder 210 and 'receiver' MAC processor 348, or between 'transmitter' PHY encoder 212 and 'receiver' PHY processor 346). Thus, the n-SDU delivered to the Physical layer encoder 212 has a physical layer header (pH) added thereto and is transmitted downlink to the physical (PHY) processor 346. The n-PDU received by the PHY processor 346 is passed to the MAC processor 348 via a second SAP 404 and an (n+1)-SDU is generated therefrom.

Figure 5:
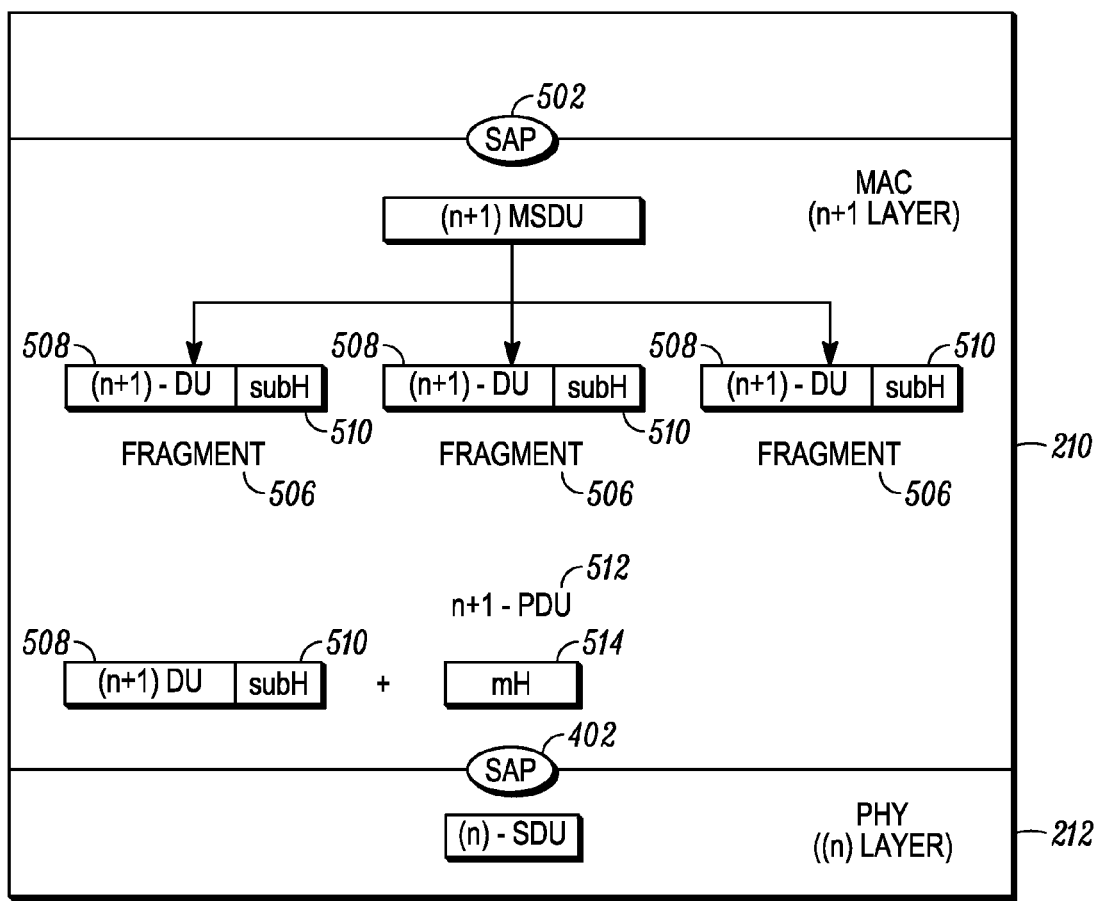
FIG. 5 is a diagram of the operation of Media Access Control (MAC) layer encoder of the base station of FIG. 2 in accordance with the embodiment of the present invention.

Referring to FIG. 5, a more detailed operation of the MAC layer encoder 210 (an n+1 layer) is shown. MAC service data units (MSDUs) are submitted to the MAC layer encoder 210 from a higher OSI layer via SAP 502. For example, (n+1)-MSDU 504 is received by the MAC layer encoder 210 and fragments 506 are generated by splitting the (n+1)-MSDU into the data units (DU) 508. Each fragment includes the (n+1) fragment data unit (DU) 508 and a subheader (subH) 510. The subH 510 includes fragment number information, such as a Fragment Sequence Number (FSN), which is assigned by the MAC layer encoder 210 sequentially to the fragments as they are generated. In addition, the subH 510 includes fragmentation control information, such as a Fragmentation Control (FC) word, which indicates the beginning and end of an MSDU. The fragmentation control information can either be an "F", a "C", a "L" or a "U", which indicates that the fragment 506 is a first fragment, a continuing fragment, a last fragment or an unfragmented MSDU fragment, respectively, of a MSDU.

A protocol data unit (PDU) 512 is then generated by combining one or more fragments 506, having the DU 508 and the subH 510, with a MAC header (mH) 514 and the PDU 512 is submitted to the physical layer encoder 212 via the SAP 402. The PHY layer encoder 212 (an n layer) receives the PDU 512 as an n-SDU 516 an encodes the n-SDU 516 fragments in accordance with a predetermined physical layer 212 coding scheme for provision to transmitter circuitry of the transceiver 204 for downlink transmission.

Figure 6:
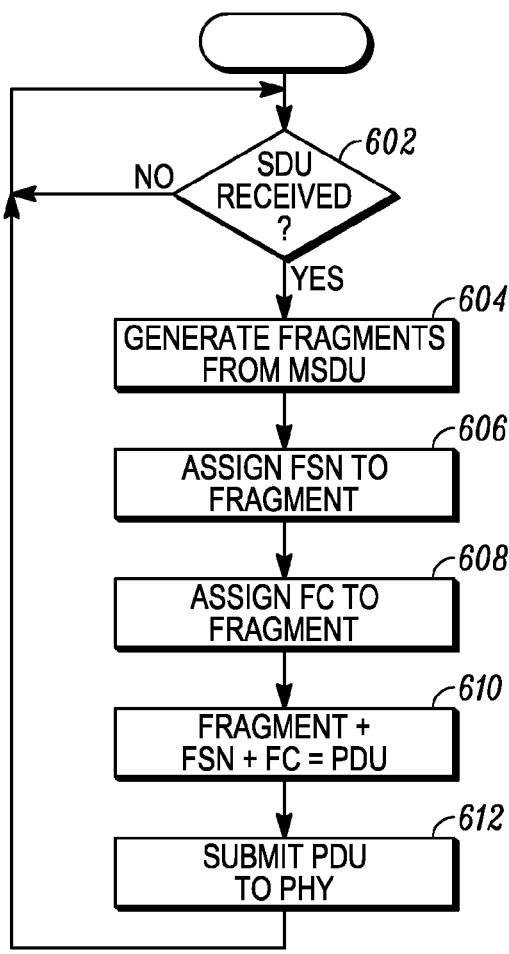
FIG. 6 is a flowchart of the operation of the MAC layer encoder of FIG. 2 in accordance with the embodiment of the present invention.

Referring to FIG. 6, a flowchart of the operation of the MAC layer encoder 210 in accordance with an embodiment of the present invention begins by determining whether a MAC layer service data unit has been received from a next higher layer 602. When an MSDU is received 602, one or more fragments are generated from the MSDU 604 by splitting the information of the MSDU into the one or more fragments.

Fragment number information, such as FSN, is sequentially assigned to the fragments as they are created 606. In order to unambiguously reorder the fragments at the downlink receiver side, it is necessary that the bit-size of the FSN be sufficiently large such that the FSN is not repeated within the group of fragments being reordered and/or that the fragments for each downlink frame are constrained to be less than the highest possible number of FSN for a specific bit-size of the FSN. In accordance with the present invention, fragments received within a single downlink frame are reordered at the downlink receiver side. Thus, the bit-size of the FSN determines how many fragments can be included in a downlink frame. The IEEE 802.16 standard specifies using a three-bit FSN or an eleven-bit FSN.

Figure 7:
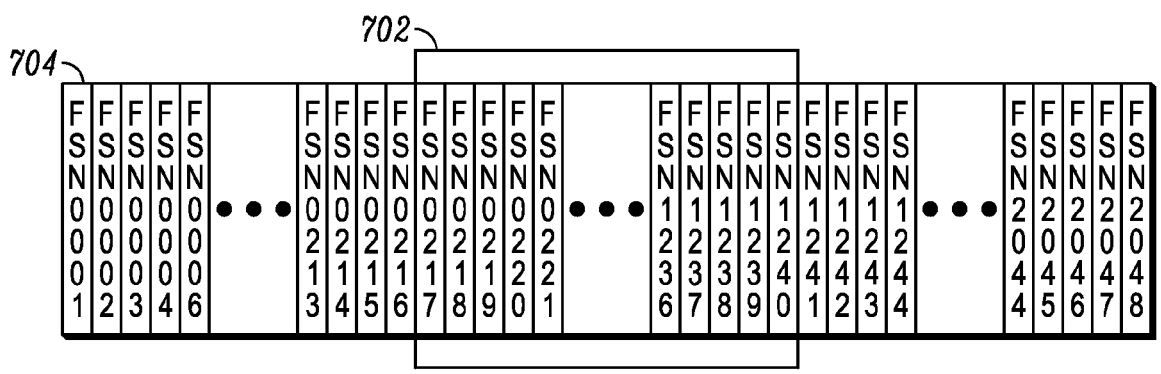
FIG. 7 is a diagram of the window of utilizable Fragment Sequence Numbers (FSNs) in accordance with the embodiment of the present invention.

In accordance with the embodiment of the present invention and in accordance with the IEEE 802.16 standard, an eleven bit FSN is utilized, providing 2048 (i.e., $2^{11}$) possibilities of unique FSNs. However, the actual number of FSNs utilized within a single downlink frame must be less than 2048 to unambiguously detect reordering of the fragments. Referring to FIG. 7, a window of Fragment Sequence Numbers (FSNs) 702 utilizable for unambiguously designating fragments within a downlink frame from within the 2048 permissible FSNs 704 in accordance with the embodiment of the present invention is shown. If the window 702 is too large, the downlink receiver may not be able to accurately determine the order of the FSNs because of the increased probability of wrap around of FSNs. If wrap around occurs, fragments may be reordered into the wrong MSDUs Thus, in accordance with the present invention, the window 702 is defined as less than or equal to one-half of the permissible FSNs 704, or less than or equal to 1024 (i.e., $2^{10}$) FSNs. This number is large enough such that the probability of submitting more than 1024 fragments into a single downlink frame for a single connection is considered remote, therefore restricting FSNs to the window 702 is not considered to have an impact on throughput or freedom of implementation. The window 702 is a moving window such that it is defined as the first chosen FSN and the $2^{10}-1$ (i.e., 1023) FSNs immediately thereafter.

Referring back to FIG. 6, fragmentation control information, such as FC, is assigned to each of the one or more fragments in response to whether the fragment is a first fragment, a continuing fragment or a last fragment of the MSDU from which the fragment was generated (i.e., split) 608 or whether the MSDU is unfragmented ("U"), i.e., the MSDU is not split. The fragment number information, encoded as a number, and the fragmentation control information (as an "F", "C", "L" or "U") are part of a subheader including fragment information associated with a fragment.

The fragment and the subheader are incorporated along with a MAC header into a PDU 610 and submitted 612 to the Physical layer 212 via the SAP 402. Processing then returns to await reception of the next MSDU 602.

When the physical layer encoder 212 receives a plurality of fragments, the plurality of fragments are incorporated into frames in accordance with the embodiment of the present invention (i.e., the number of fragments in the frames is constrained to be within the $2^{10}$ window of possible FSNs) and encoded in accordance with a predetermined physical layer 212 coding scheme. The predetermined physical layer 212 coding scheme may be an orthogonal frequency domain multiple access (OFDMA) coding scheme and the plurality of fragments are then encoded into a plurality of OFDMA downlink bursts. The OFDMA coding scheme, however, may lead to out-of-order fragments during downlink burst-mode wireless communications.

Figure 8A:
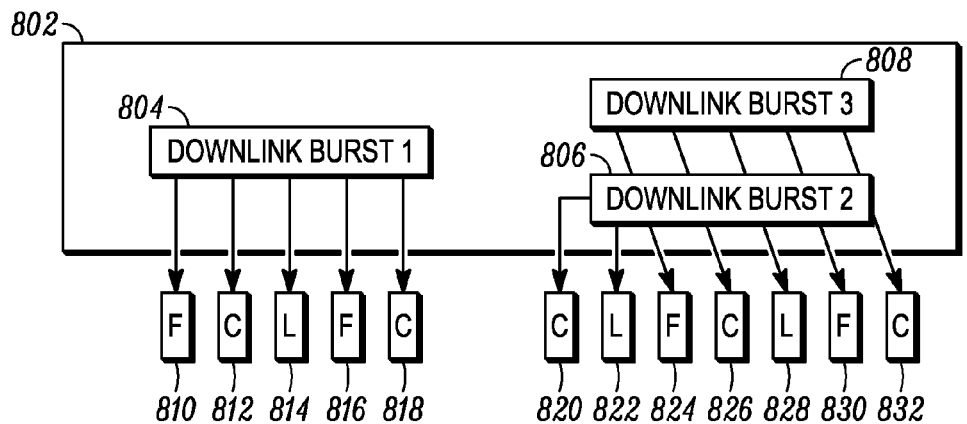
FIGS. 8A and 8B, is a diagram of the downlink burst mode operation of the base station of FIG. 2 in accordance with the embodiment of the present invention.
Figure 8B:
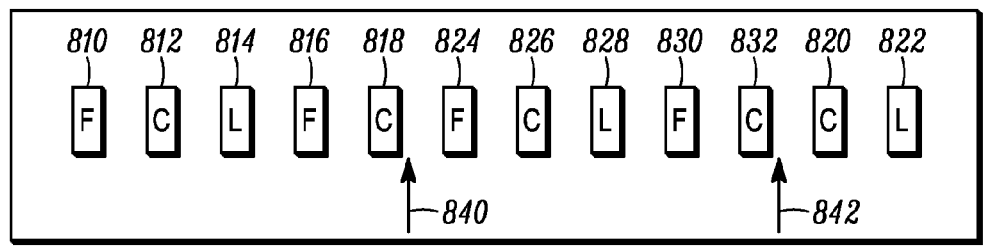

Referring next to FIG. 8, including FIGS. 8A and 8B, a downlink burst mode operation diagram reveals out-of-order problems that may arise during transmission of OFDMA downlink bursts. FIG. 8A depicts one transmitted downlink frame 802 containing three downlink bursts 804, 806, 808 including fragments of four MSDUs: MSDU1, MSDU2, MSDU3 and MSDU4. Downlink burst 804 includes one or more protocol data units (PDUs) comprising three fragments 810, 812, 814 of MSDU1 and the first two fragments 816, 818 of MSDU2. Downlink burst 806 includes one or more PDUs comprising the last two fragments 820, 822 of MSDU2. Downlink burst 808 includes one or more PDUs comprising three fragments 824, 826, 828 of MSDU3 and the first two fragments 830, 832 of MSDU4. The FSN is assigned 606 to number each fragment to guarantee an 'in-order' delivery of complete MSDUs such that, when transmitted, the FSN of the fragments in a downlink burst are in-order. The FC assigned to each fragment 608 is used to determine whether a received MSDU is complete wherein, as described above, a fragment is assigned an FC of "F" to indicate the first fragment of an MSDU or is assigned an FC of "L" to indicate the last fragment of an MSDU.

FIG. 8B depicts the order of fragments in time received as PDUs at the MAC layer processor 348 when receiving the downlink frame 802. For example, the FSN of the fragment 820 of downlink burst 806 is successive to the FSN of the fragment 818 of downlink burst 804. However, the order in which the MAC layer processor 348 receives each downlink burst may not be in-order and, hence, the fragments are received out-of-order. At time 840, an in-complete MSDU2 remains. The next fragment 824 has its FC set to "F" and its sequence number is not successive to the previously received fragment 818. According to IEEE standard 802.16, the incomplete MSDU2 should be discarded.

At time 842, another incomplete MSDU (a second portion of MSDU2) has been reassembled by the MAC layer processor 348 from fragments received thereby. The next received fragment 820 has its FC set to "C". In accordance with standard 802.16, the incomplete MSDU should be discarded and the MAC layer processor 348 should discard all fragments until the first fragment ("F") of another MSDU is detected or until a non-fragmented MSDU ("U") is detected. Since false detection of a fragment loss results in unnecessary loss of MSDUs in conventional MAC layer MSDU reassembly techniques using, for example, IEEE 802.16, in accordance with the present invention, the fragments are not lost but reordered as described hereinbelow.

Figure 9:
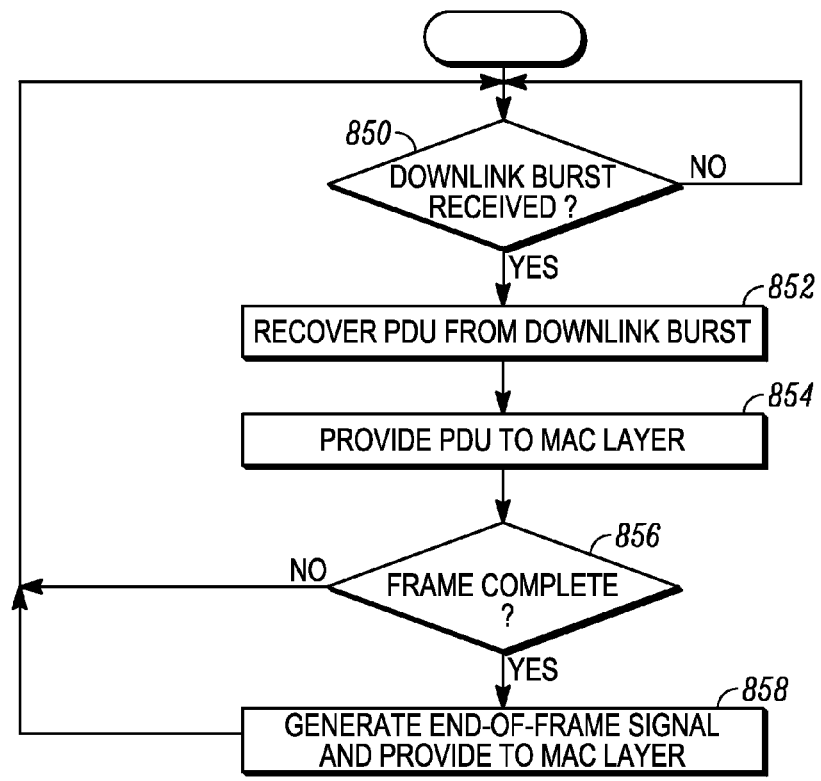
FIG. 9 is a flowchart of the operation of the Physical layer processor of FIG. 3 in accordance with the embodiment of the present invention.

Referring to FIG. 9, processing of received communications by the physical layer processor 346 awaits reception of a downlink burst communication 850. When a downlink burst communication is received 850, the downlink burst is processed to recover the PDUs thereof 852. The PDUs are then provided 854 to the MAC layer processor 348 for processing in accordance with the present invention.

Until the downlink frame is completely received 856, the physical layer processor 346 continues to recover the PDUs from the downlink burst received 852 and provide the recovered PDUs 854 to the MAC layer processor 348. The physical layer processor 346 knows the standard size and structure of the downlink frame as defined in accordance with the embodiment of the present invention. When the downlink frame is completely received 856, in accordance with the present invention the physical layer processor 346 generates an end-of-frame signal and provides the end-of-frame signal 858 to the MAC layer processor 348, and operation returns to await reception of the first downlink burst of the next frame.

Figure 10:
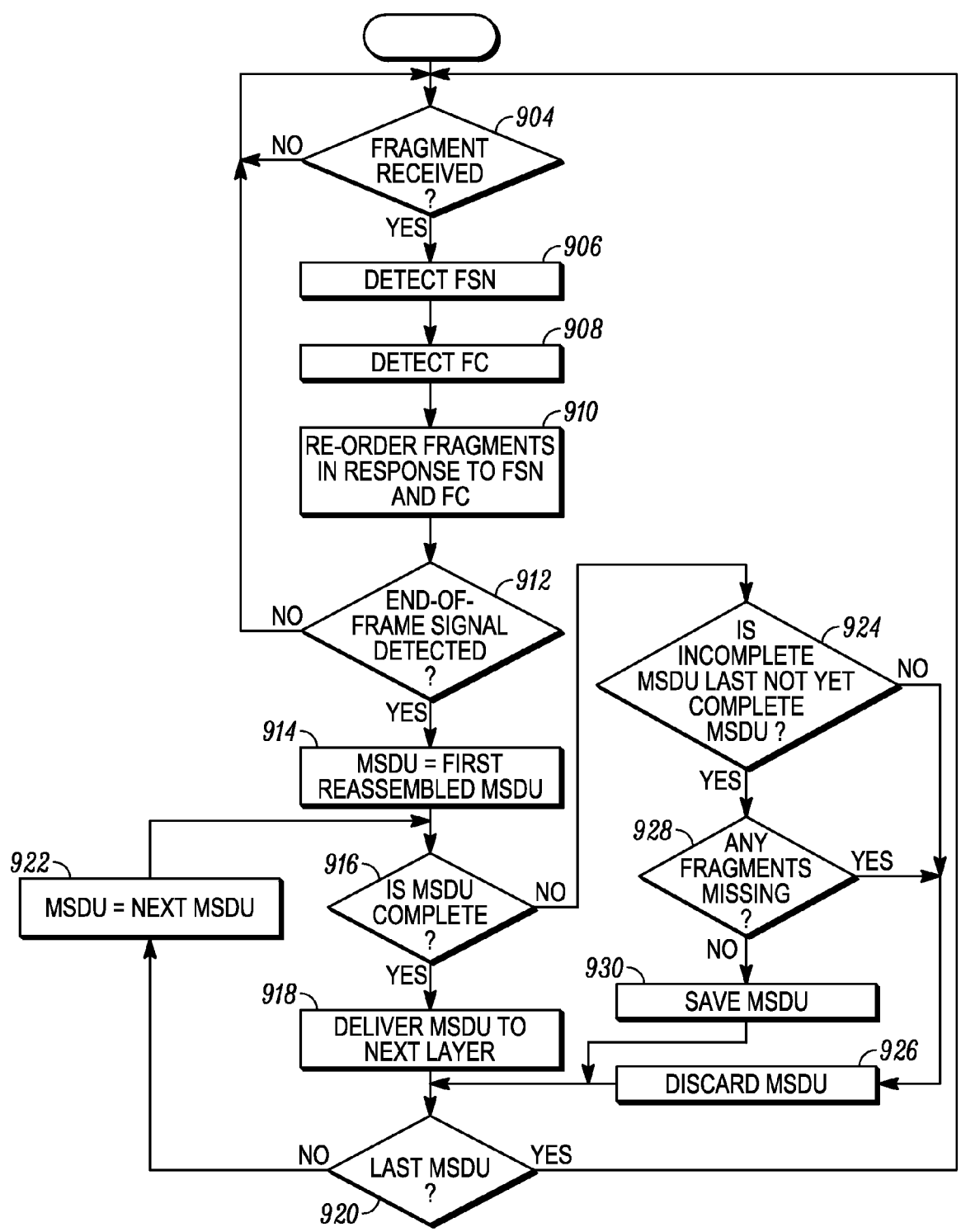
FIG. 10 is a flowchart of the operation of the MAC layer processor of FIG. 3 in accordance with the embodiment of the present invention.
Figure 11:
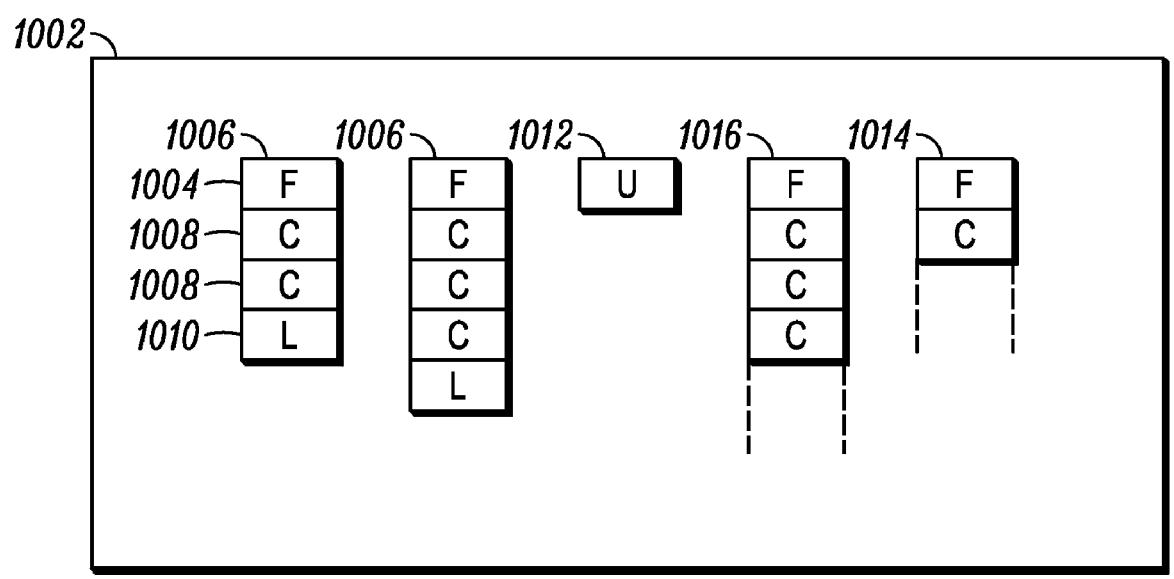
FIG. 11 is a diagram of the operation of a fragment reordering scheme of the MAC layer processor of FIG. 3 in accordance with the embodiment of the present invention.

Referring to FIG. 10, operation of the MAC layer processor 348 in accordance with an embodiment of the present invention flowchart begins by determining if a new downlink fragment is received 904 from the OFDMA physical layer 346. When a downlink fragment is received 904, the fragment number information (e.g., FSN) associated with the received downlink fragment is determined 906 and the fragmentation control information (e.g., FC) associated with the received downlink fragment is determined 908. The fragment is then reordered with other received fragments of the downlink frame into one or more reassembled MSDUs in response to the fragment number information and the fragment control information 910. An exemplary reordering scheme is depicted in FIG. 11 and explained hereinbelow.

If no end-of-frame signal is detected 912, processing returns to await the next fragment 904. In accordance with the embodiment of the present invention, when an end-of-frame signal indicating that all of the plurality of fragments for a downlink frame have been received from the physical layer has been detected 912, the reassembled MSDUs are post-processed. The first reassembled MSDU is set as the MSDU for post-processing 914 and the MAC layer processor 348 determines whether each of the reassembled MSDUs is a complete MSDU or an incomplete MSDU 916. If the MSDU is a complete MSDU 916, the complete MSDUs is delivered to the next layer 918. If the complete MSDU is not the last MSDU of the downlink frame 920, the next MSDU is set as the MSDU for post-processing 922 and post-processing returns to determine if the MSDU is complete or incomplete 916. If, on the other hand, the MSDU is the last MSDU 920, processing returns to await the next fragment 904 (i.e., a first fragment of a new frame).

If a MSDU is determined to be incomplete 916, it is next determined whether the incomplete MSDU is a last not yet complete MSDU 924. If the MSDU is not a last not yet complete MSDU 924, the incomplete MSDU is discarded 926 and it is determined whether the post-processed MSDU is the last MSDU of the downlink frame 920.

If an incomplete MSDU is determined to be a last not yet complete MSDU 924, processing next determines whether the last not yet complete MSDU has any missing fragments 928. If there are no missing fragments 928, the last not yet complete MSDU is saved 930 and it is determined whether the post-processed MSDU is the last MSDU of the downlink frame 920. If there are missing fragments 928, the last not yet complete MSDU is discarded 926 and it is determined whether the post-processed MSDU is the last MSDU of the downlink frame 920.

A number of schemes can be used for reordering the fragments received during pre-processing by the MAC layer processor 348. FIG. 11 depicts an exemplary scheme for reordering the fragments 910 in response to the FSN and FC. When a first fragment for a downlink frame is received, the MAC layer processor 348 begins establishment of a list of reassembled MSDUs 1002 in temporary memory. In response to receiving a fragment 1004 with an "F" value FC information, reassembling of a new reassembled MSDU 1006 is begun. Thereafter, fragments 1008 with a "C" value FC are added to the MSDU in response to the FSN thereof (e.g., when a fragment with an FC having a "C" value is received, it is reassembled into an MSDU by placing it after a fragment having the next lowest FSN thereby reassembling MSDUs in response to the FC and the FSN). When a fragment 1010 with an "L" value FC is received, it completes an MSDU if the FSNs of the MSDU are contiguous 1010. When a fragment 1012 with a "U" value FC is received, it is a complete MSDU by itself.

When the end-of-frame signal is detected 912 (FIG. 10), post-processing by the MAC layer processor 348 submits the complete MSDUs 1006, 1012 to the next layer. The last not yet complete MSDU 1014 is saved 930 for pre-processing of the next downlink frame as discussed above and any other incomplete MSDUs 1016 are discarded 926.

Thus, even though fragments of an MSDU are delivered out-of-order at the MAC layer processor 348, in accordance with the present invention the fragments can be reordered into complete MSDUs, thereby preventing discarding of such MSDUs. Embodiments of the present invention, therefore, increase reliability of communications, particularly communications such as OFDMA RF communications which are susceptible to fragments arriving out-of-order because of the downlink databurst structure inherent thereto. In addition, the time necessary for reliable communications can be reduced as enablement of embodiments of the present invention renders it unnecessary to retransmit discarded out-of-order MSDUs.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method of processing within a Medium Access Control (MAC) layer a downlink frame comprising a plurality of fragments constituting one or more MAC Service Data Units (MSDUs) wherein each of the plurality of fragments includes fragmentation control information and fragment number information for determining an order of a fragment within an associated one of the one or more MSDUs, the method comprising the steps of:

pre-processing the plurality of fragments of a downlink frame by reordering the plurality of fragments within the associated one of the one or more MSDUs in response to both the fragmentation control information and the fragment number information of each of the plurality of fragments, wherein the fragmentation control information indicates at least a first fragment of one of the one or more MSDUs;

detecting an end-of-frame signal indicating that all of the plurality of fragments for a downlink frame have been received;

post-processing the plurality of fragments of the downlink frame in response to detecting the end-of-frame signal, wherein the step of post-processing comprises the steps of:

determining in response to the fragmentation control information and the fragment number information whether a received MSDU is a complete MSDU or an incomplete MSDU;

saving all complete MSDUs;

determining in response to the fragmentation control information if an incomplete MSDU is a last not yet complete MSDU, wherein an incomplete MSDU comprises an MSDU having less than all fragments of the MSDU received before the end-of-frame signal;

if the incomplete MSDU is a last not yet complete MSDU, determining in response to the fragment number information whether the last not yet complete MSDU has any missing fragments, wherein the last not yet complete MSDU has missing fragments if after pre-processing reorders the fragments the fragment number information of the last not yet complete MSDU indicates that the last not yet complete MSDU has a fragment missing between a lowest fragment number information fragment of the last not yet complete MSDU and a highest fragment number information fragment of the last not yet complete MSDU;

saving the last not yet complete MSDU if it has no missing fragments; and discarding the incomplete MSDU if it is not a last not yet complete MSDU or if it is a last not yet complete MSDU that has missing fragments; and delivering the saved MSDUs, including all saved complete MSDUs and any saved last not yet complete MSDU, to a next layer.

2. The method in accordance with claim 1 wherein the step of pre-processing comprises the step of reordering the plurality of fragments into one or more reassembled MSDUs in response to the fragmentation control information and the fragment number information of each of the plurality of fragments.

3. The method in accordance with claim 2 wherein the step of post-processing further comprises the step of determining whether each of the one or more reassembled MSDUs is a complete MSDU or an incomplete MSDU, and wherein the step of delivering one or more of the MSDUs to a next layer comprises the step of delivering any complete MSDUs to the next layer.

4. The method in accordance with claim 1 further comprising the step of receiving protocol data units (PDUs) of a downlink frame from a physical layer to the MAC layer, the physical layer generating the end-of-frame signal to indicate that all of the plurality of fragments for the downlink frame have been provided from the physical layer to the MAC layer and providing the end-of-frame signal to the MAC layer after providing all PDUs including all of the plurality of fragments for the downlink frame to the MAC layer.

5. The method in accordance with claim 4 wherein the step of detecting the end-of frame signal comprises the step of determining that all of the plurality of fragments for the downlink frame have been received from the physical layer in response to detecting the end-of-frame signal.

6. The method in accordance with claim 4 wherein the physical layer is an orthogonal frequency domain multiple access (OFDMA) physical layer.

7. The method in accordance with claim 1 wherein the fragmentation control information further indicates one of a continuing fragment, a last fragment or an unfragmented fragment of one of the one or more MSDUs.

8. A communication device comprising:

receiver circuitry receiving signals from a source external to the communication device;

a physical layer processor coupled to the receiver and processing the signals in accordance with a predetermined physical layer coding scheme to recover a downlinik frame, the physical layer generating a plurality of protocol data units (PDUs) comprising a plurality of fragments of the downlinik frame and an end-of-frame signal, each of the plurality of fragments including fragmentation control information and fragment number information; and a Medium Access Control (MAC) layer processor coupled to the physical layer processor and receiving the plurality of PDUs therefrom including the plurality of fragments, the MAC layer processor pre-processing the plurality of fragments of the downlink frame to reassemble MAC layer Service Data Units (MSDUs) therefrom by reordering the plurality of fragments into one or more reassembled MSDUs in response to the fragmentation control information and the fragment number information of each of the plurality of fragments, the fragmentation control information indicating at least a first fragment of one of the one or more MSDUs, the MAC layer processor further, in response to detecting the end-of-frame signal indicating that all of the plurality of fragments for a downlink frame have been received, post-processing the plurality of fragments of the downlink frame by determining whether each of the one or more reassembled MSDUs is a complete MSDU and delivering any complete MSDUs to a next layer or by determining whether each of the one or more reassembled MSDUs is an incomplete MSDU and then determining if the incomplete MSDU is a last not yet complete MSDU with no missing fragments in response to the last not yet complete MSDU having no fragments missing between a fragment thereof having a lowest value fragment number information and a fragment thereof having a highest value fragment information, and saving the incomplete MSDU if the incomplete MSDU is a last not yet complete MSDU with no missing fragments or discarding the incomplete MSDU if it is not a last not yet complete MSDU or if it is a last not yet complete MSDU that has missing fragments.

9. The communication device in accordance with claim 8 wherein the communication device is a wireless communication device, and wherein the predetermined physical layer coding scheme is an orthogonal frequency domain multiple access (OFDMA) coding scheme.

10. The communication device in accordance with claim 8 wherein the fragmentation control information further indicates either a continuing fragment, a last fragment or an unfragmented fragment of one of the one or more MSDUs.

11. A method for generating downlink frames comprising the steps of:

splitting a Medium Access Control (MAC) layer Service Data Units (MSDUs) into one or more data units;

generating fragments from the one or more data units, each of the fragments including fragmentation control information, fragment number information and one of the one or more data units; and assigning a number of the fragments to one of the downlink frames, the number being less than or equal to a predetermined number of possible fragments, wherein the predetermined number of possible fragments is one-half of a total number of possible fragments, the total number of possible fragments being $2^{11}$.

12. The method in accordance with claim 11 wherein the step of generating the fragments comprises the steps of:
   determining whether a data unit is a first data unit of one of the MSDUs, a last data unit of one of the MSDUs or a complete one of the MSDUs; and
   generating a fragment from the data unit, wherein the fragment includes first predetermined fragmentation control information indicating that the data unit is a first data unit of a MSDU.

13. The method in accordance with claim 11 wherein the step of generating the fragments comprises the steps of:
   determining whether a data unit is a first data unit of one of the MSDUs, a last data unit of one of the MSDUs or a complete one of the MSDUs; and
   generating a fragment from the data unit, wherein the fragment includes second predetermined fragmentation control information indicating that the data unit is a last data unit of a MSDU.

14. The method in accordance with claim 11 wherein the step of generating the fragments comprises the steps of:
   determining whether a data unit is a first data unit of one of the MSDUs, a last data unit of one of the MSDUs or a complete one of the MSDUs; and
   generating a fragment from the data unit, wherein the fragment includes third predetermined fragmentation control information indicating that the data unit is an unfragmented MSDU.

15. The method in accordance with claim 11 wherein the step of generating the fragments comprises the steps of:
   determining whether a data unit is a first data unit of one of the MSDUs, a last data unit of one of the MSDUs or a complete one of the MSDUs; and
   generating a fragment from the data unit, wherein the fragment includes fourth predetermined fragmentation control information indicating that the data unit is neither a first data unit of one of the MSDUs, a last data unit of one of the MSDUs nor a complete one of the MSDUs.

* * * * *